US012537314B2

United States Patent

(12) Dadic et al.

(10) Patent No.: US 12,537,314 B2

(45) Date of Patent: Jan. 27, 2026

(54) ACTIVE PHASED ARRAY WITH INTEGRATED ANTENNAS AND CIRCUITS ON COMMON PRINTED CIRCUIT CARDS

(71) Applicant: CesiumAstro, Inc., Austin, TX (US)

(72) Inventors: Danilo Dadic, Austin, TX (US); Spencer Erekson, Superior, CO (US); Ramez Harmaneh, Kyle, TX (US); Thomas Magesacher, Austin, TX (US); Donald Pontrelli, Austin, TX (US); Aaron Quan, Austin, TX (US); Shey Sabripour, Austin, TX (US); Abraham Wolfgang, Thornton, CO (US)

(73) Assignee: CesiumAstro, Inc., Austin, TX (US)

( * ) Notice: Subject to any disclaimer, the term of this patent is extended or adjusted under 35 U.S.C. 154(b) by 0 days.

(21) Appl. No.: 18/115,745

(22) Filed: Feb. 28, 2023

(65) Prior Publication Data

US 2025/0210882 A1 Jun. 26, 2025

(51) Int. Cl.

*H01Q 21/06* (2006.01)
*H01Q 13/02* (2006.01)
*H01Q 15/24* (2006.01)
*H01Q 21/00* (2006.01)
*H01P 1/17* (2006.01)
*H01Q 23/00* (2006.01)

(52) U.S. Cl.

CPC ....... *H01Q 21/064* (2013.01); *H01Q 13/0241* (2013.01); *H01Q 15/24* (2013.01); *H01Q 21/0025* (2013.01); *H01P 1/171* (2013.01); *H01Q 23/00* (2013.01)

(58) Field of Classification Search

CPC ............... H01Q 13/0241; H01Q 15/24; H01Q 21/0025; H01Q 21/064; H01P 1/171

See application file for complete search history.

(56) References Cited

U.S. PATENT DOCUMENTS

2017/0263991 A1* 9/2017 Jensen .................... H01P 1/173
2019/0190161 A1* 6/2019 Hollenbeck .......... H01Q 15/242

* cited by examiner

*Primary Examiner* — Daniel Munoz

(74) *Attorney, Agent, or Firm* — Hogan Lovells US LLP

(57) ABSTRACT

A phased array antenna device may include a base including circuitry configured to couple to a backplane and a plurality of circuit cards arranged in parallel and coupled to circuitry of the base. Each circuit card may include an array of circularly polarized unit antenna elements integrated into the circuit card and arranged along an edge of the circuit card. Each circularly polarized unit antenna element of the array may be configured to radiate and receive electromagnetic signals directly from the edge of the circuit card. In some implementations, the edge of each circuit card may include a plurality of substrate extensions with chamfered edges formed from a substrate of the circuit card. At least a portion of some of the chamfered edges may include a metal coating.

20 Claims, 4 Drawing Sheets

ACTIVE PHASED ARRAY WITH INTEGRATED ANTENNAS AND CIRCUITS ON COMMON PRINTED CIRCUIT CARDS

FIELD

The present disclosure is generally related to circularly polarized antennas, and more particularly to phased array antennas formed from integrated circuit antenna printed circuit cards.

BACKGROUND

Satellite systems, radio systems, television systems, smartphones, and other systems may utilize antennas for sending and receiving radio waves. An antenna is an electrical device that converts electrical signals from a radio transmitter into radio waves for transmission by the antenna and that converts radio waves received by the antenna into electrical signals using a radio receiver.

By convention, an antenna's polarization refers to the direction of the electric field. In a linear polarized antenna, the electric field of the radio wave oscillates in a single direction and is usually either vertical or horizontal. In a circularly polarized antenna, the electric field and magnetic field of the radio wave rotates at the radio frequency circularly around the axis of propagation. The electric field in a circularly polarized antenna has a constant magnitude and changes in a rotary manner along the propagation direction, which can reduce the loss caused by a misalignment between the transmitter and receiver antennas.

Conventionally, a tray-based phased array antenna may include a plurality of printed circuit boards (PCBs) holding various chipsets connected to an antenna. These PCBs are often referred to as "slices" or circuit cards. The PCBs and the antennas may utilize hundreds or thousands of connectors to couple radio frequency (RF) power between the PCBs and the antennas. The connectors, the mechanical assembly, and the packaging may introduce cost, signal loss, increased size, increased weight, reduced reliability, and increased costs in terms of labor expense and time to produce each phased array antenna.

SUMMARY

To eliminate the need for the connectors for coupling a printed circuit board to a circularly polarized antenna, embodiments of systems, circuits, and devices described herein may eliminate the antenna tile and the connectors by integrating the circularly polarized antenna into the printed circuit board circuit cards. The systems, circuits, and devices may include a substrate integrated septum polarizer, which may be a three-port device that divides a square substrate-integrated waveguide into two rectangular substrate-integrated waveguides using multiple separation ridges. The septum polarizer may be configured to convert a linearly polarized transverse electric field into a circularly polarized signal and vice versa. An ideal circularly polarized signal may be composed of two orthogonal Electrical field (E-field) components with equal sinusoidally varying magnitudes that are ninety degrees (90°) out of phase with each other.

Implementations described below include printed circuit boards (PCBs) with integrated circularly polarized phased array antenna elements that may enable satellite communication systems and that may provide a wider circularly polarized (CP) bandwidth than conventional CP antenna systems. A phased array antenna may include a plurality of PCBs or circuit cards arranged vertically relative to a boresight of the antenna.

In some implementations, an antenna module may include a plurality of circuit cards, each of which may include one or more integrated circularly polarized antennas that may enable an increased axial bandwidth across both frequency and scan bandwidth. Each circuit card may include an interface to couple the circuit card to backend systems, transmitter circuitry configured to generate output signals for transmission by an antenna, and receiver circuitry configured to filter and amplify received signals from the antenna. Each circuit card may include an array of integrated circularly polarized antennas for transmitting signals and for receiving signals.

In some implementations, an antenna system may include a plurality of circuit cards arranged in parallel. Each circuit card may include an array of integrated antenna units. Each antenna unit may include a septum polarizer positioned at an edge of the circuit card and a pair of substrate integrated waveguides, each of which may have a rectangular aperture and stacked such that the combination has a square aperture. A selected one of the pair of substrate integrated waveguides may be activated to excite the septum polarizer to provide either a right or left polarization, depending on which of the substrate integrated waveguides is excited. Each circuit card may include a plurality of substrate extensions with chamfered edges, at least one of which protrudes from the square aperture of each pair of substrate integrated waveguides. The resulting antenna system may provide increased axial ratio (AR) bandwidth, which may be enabled by the substrate extension. The substrate extension may act as an impedance matching layer enabling a larger operational CP bandwidth across the scan. The antenna design may enable both transmit and receive operations at selected frequency bands. In one specific, non-limiting example, the antenna design may enable transmit and receive operations a k-band operating bandwidth (from 17.7 to 21.2 Gigahertz (GHz)) and at a Ka-band operating bandwidth (from 27.5 to 31 GHz). In other implementations, the antenna design may be configured for transmit and receive operations at other frequencies.

In some implementations, the substrate extensions may include chamfered edges. In some implementations, portions of the chamfered edges between adjacent substrate extensions may be metallized to provide improved inter-antenna isolation.

The circuit card may be sandwiched on each side by a thin metallic sheet to enhance the thermal characteristics of the system and to limit inter-chip interference. Each circuit card may include a first portion having a first thickness and configured to secure the array of integrated antenna units and may include a second portion having a second thickness that is less than the first thickness. Each circuit card may include transmitter circuits, receiver circuits, and other circuitry coupled to the array of integrated antenna units to facilitate sending and receiving radio frequency signals via the antenna units. The reduced thickness of the second portion may enable the circuit cards to secure the various chipsets and may maintain a desired antenna pitch for optimal design considerations.

In some implementations, a phased array antenna device may include a base including circuitry configured to couple to a backplane and a plurality of circuit cards arranged in parallel and coupled to circuitry of the base. The backplane may be a PCB configured to pass signals between a plurality of circuit cards (or other PCBs) of the antenna and between the plurality of circuit cards and external systems. Each circuit card may include an array of circularly polarized unit antenna elements integrated into the circuit card and arranged along an edge of the circuit card. Each circularly polarized unit antenna element of the array may be configured to radiate and receive electromagnetic signals directly from the edge of the circuit card. In some implementations, the edge of each circuit card may include a plurality of substrate extensions with chamfered edges formed from a substrate of the circuit card. At least a portion of some of the chamfered edges may include a metal coating.

In other implementations, a phased array antenna device may include a plurality of circuit cards arranged in parallel. Each circuit card may include an array of circularly polarized unit antenna elements integrated into the circuit card and arranged along an edge of the circuit card. Each circularly polarized unit antenna element of the array may be configured to radiate electromagnetic signals directly from the edge of the circuit card. Each circuit card may include a plurality of substrate extensions with chamfered edges formed from a substrate of the circuit card along the edge. Each of the substrate extensions or at least some of the substrate extensions may correspond to one of circularly polarized unit antenna elements. In some implementations, the chamfered edges between adjacent substrate extensions may form a trench that is aligned to edges of adjacent circularly polarized antenna elements of the array. In some implementations, a metal coating may be formed in the trench between each of the adjacent substrate extensions.

In still other implementations, a phased array antenna device may include a base including a connector configured to couple to a backplane and circuitry coupled to the connector. The phased array antenna device may include a plurality of circuit cards arranged in parallel and coupled to the circuitry of the base. Each circuit card may include an array of circularly polarized unit antenna elements integrated into and arranged along an edge of the circuit card and configured to radiate electromagnetic signals directly from the edge of the circuit card. Each circuit card may include a plurality of substrate extensions with chamfered edges formed from a substrate of the circuit card along the edge. One or more of the substrate extensions may correspond to one of circularly polarized unit antenna elements.

BRIEF DESCRIPTION OF THE DRAWINGS

The detailed description is set forth with reference to the accompanying figures. In the figures, the left most digit(s) of a reference number identifies the figure in which the reference number first appears. The use of the same reference numbers in different figures indicates similar or identical items or features.

Figure 1A:
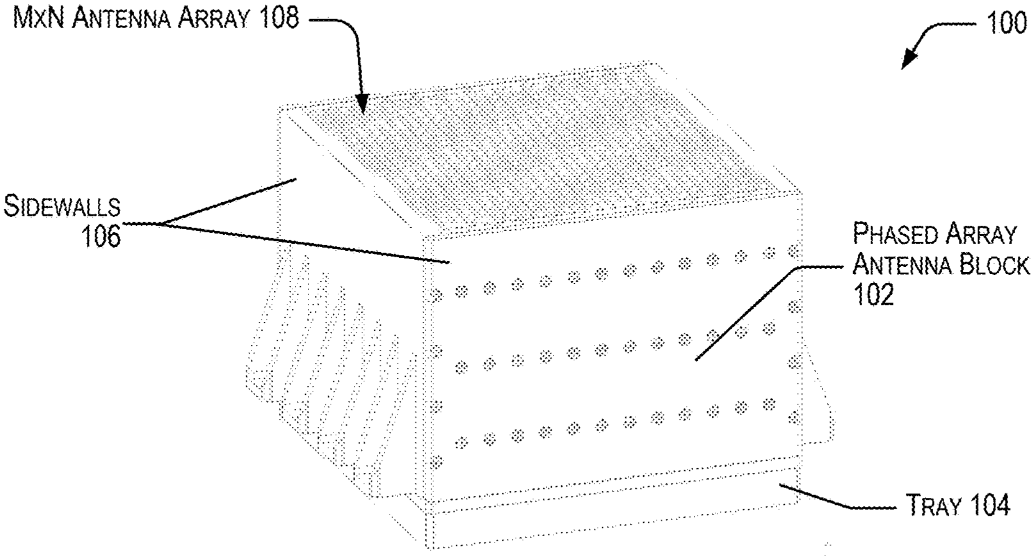
FIG. 1A depicts a diagram of a circuit card integrated circularly polarized antenna device, in accordance with certain embodiments of the present disclosure.

While implementations are described in this disclosure by way of example, those skilled in the art will recognize that the implementations are not limited to the examples or figures described. The figures and detailed description thereto are not intended to limit implementations to the particular form disclosed, but on the contrary, the intention is to cover all modifications, equivalents, and alternatives falling within the spirit and scope as defined by the appended claims. The headings used in this disclosure are for organizational purposes only and are not meant to limit the scope of the description or the claims. As used throughout this application, the word "may" is used in a permissive sense (in other words, the term "may" is intended to mean "having the potential to") instead of in a mandatory sense (as in "must"). Similarly, the terms "include", "including", and "includes" mean "including, but not limited to".

DETAILED DESCRIPTION OF ILLUSTRATIVE EMBODIMENTS

Embodiments of an antenna device, a circuit, and a unit antenna element are described below that include a circularly polarized antenna that is integrated into a circuit card. A linear array of unit antenna elements may be distributed along an edge of the circuit card, and multiple circuit cards may be arranged in parallel and coupled to a backplane and other circuitry to form a phased array antenna. As used herein, the term backplane refers to a PCB configured to pass signals between multitude of circuit cards and to pass signals between the multitude of circuit cards and external systems.

In some implementations, the linear array may be arranged along the circuit edge so that the unit antenna elements are asymmetrical about a center of the card. To form the antenna device, the multiple circuit cards may be arranged vertically relative to a boresight of the antenna. The multiple circuit cards may be arranged so that every other card is rotated 180 degrees so that the asymmetrical offset is reversed, producing a triangular arrangement of unit antenna elements between two adjacent cards. The resulting array of circuit cards may form an antenna lattice.

Embodiments of a phased array antenna device are described herein that include a plurality of circuit cards arranged in parallel, where each circuit card includes a plurality of CP antenna elements integrated into the circuit card along one edge. The circuit card may be implemented as a printed circuit board (PCB) or other circuit structure. Integration of the CP antenna elements may eliminate the connectors, enable a reduced profile (reduced dimensions), reduce or eliminate signal loss, reduce the overall weight and size, eliminate the need for a separate antenna tile, and reduce labor for each phased array device. The phased array antenna device using substrate integrated technology may provide a wider CP bandwidth than the prior art. In particular, the phased array antenna device may enable an increased axial ratio bandwidth, across both frequency and scan. In some implementations, the CP antenna elements may be arranged asymmetrically about a center line of the circuit card, and the parallel-arranged circuit cards may be arranged such that every other circuit card is rotated 180 degrees relative to adjacent circuit cards. The alternating orientations of the circuit cards cooperate with the asymmetrical arrangement of CP antenna elements to form a triangular matrix of CP antenna elements.

In some implementations, the phased array antenna device may include a plurality of unit antenna elements. Each unit antenna element may include a septum polarizer positioned at the edge of the circuit card and a pair of substrate integrated waveguides, each of which may be configured to excite the septum polarizer. Each unit antenna element may include a substrate extension with chamfered edges protruding from a square aperture of the substrate integrated waveguides. The resultant CP radiation from the unit antenna element may be enabled by the septum polarizer, which may produce a signal with first (right) polarization or second (left) polarization depending on which of the substrate integrated waveguides is used to excite the septum polarizer.

The substrate extension may enable increased axial ratio bandwidth by acting as an impedance matching layer, which enables a larger operational CP bandwidth across scan frequency. The antenna design may enable both transmit and receive operations at a k-band operating bandwidth (from 17.7 to 21.2 Gigahertz (GHz)) and at a Ka-band operating bandwidth (from 27.5 to 31 GHz). In some implementations, portions of the chamfered edges between adjacent substrate extensions may be metallized to provide improved inter-antenna isolation.

The circuit card may be sandwiched on each side by a thin metallic sheet to enhance the thermal characteristics of the system and to limit inter-chip interference. Each circuit card may include a first portion having a first thickness and configured to secure the array of integrated antenna units and may include a second portion having a second thickness that is less than the first thickness. Each circuit card may include transmitter circuits, receiver circuits, and other circuitry coupled to the array of integrated antenna units to facilitate sending and receiving radio frequency signals via the antenna units. The reduced thickness of the second portion may enable the circuit cards to secure the various chipsets and may maintain a desired antenna pitch for optimal design considerations.

FIG. 1A depicts a diagram of a circuit card integrated circularly polarized antenna device 100, in accordance with certain embodiments of the present disclosure. The device 100 may include a phased array antenna block 102. The phased array antenna block 102 is depicted as having a substantially square shape, which may facilitate a dense arrangement of phased array antenna blocks 102 in a larger system. The phased array antenna block 102 may include a plurality of circuit cards arranged vertically relative to a boresight of the antenna.

The phased array antenna block 102 may include a base or tray 104 sized to secure a plurality of circuit components and a connector configured to couple to a backplane, which may include a PCB configured to pass signals between the plurality of circuit cards and between the plurality of circuit cards and external systems. The tray 104 may include a plurality of circuit cards, which may be coupled to the tray 104 and arranged in parallel. The phased array antenna block 102 may include a plurality of sidewalls 106, which may extend from the tray 104 and which surround and protect the plurality of circuit cards. The edge of each of the circuit cards may include a linear array of unit antenna devices, and the parallel arrangement of the circuit cards may produce a two-dimensional (M×N) antenna array 108, where M represents the number of unit antenna devices along an edge of one of the circuit cards and N represents the number of circuit cards arranged in parallel within the phased array antenna block 102.

In some implementations, the array of unit antenna elements may be arranged slightly asymmetrically with respect to a center line of the circuit card and are constructed so that they can be inserted into or coupled to the backplane within the tray 104 in either of two orientations: zero degrees or one hundred eight degrees of rotation. By rotating every other circuit card during assembly, the unit antenna elements are arranged to form a triangular lattice. Each circuit card may have the same configuration and, by rotating every other circuit card, the asymmetrical arrangement of unit antenna elements may result in the unit antenna elements forming triangular shapes, yielding a triangular lattice.

Figure 1B:
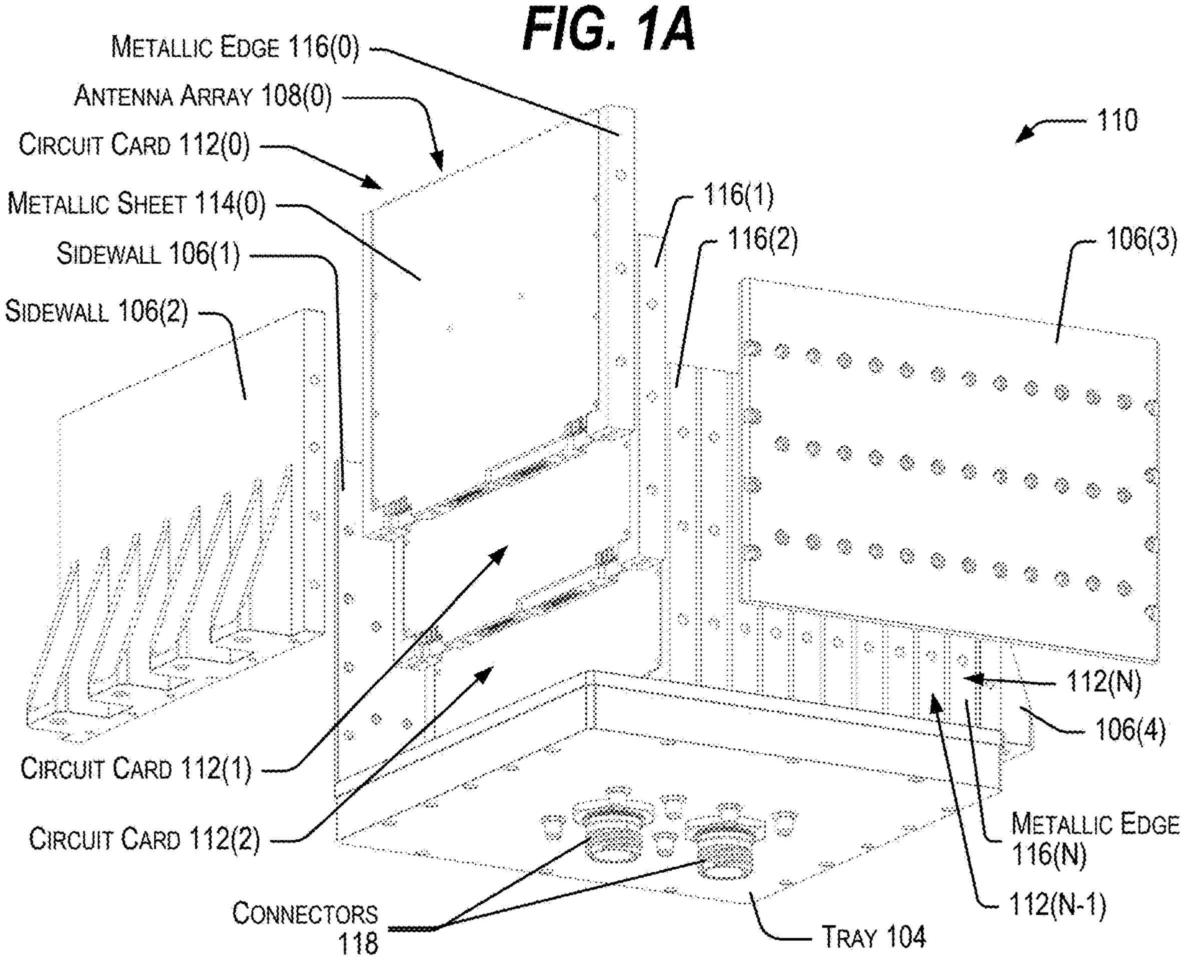
FIG. 1B depicts a partially exploded view of the circuit card integrated circularly polarized antenna device of FIG. 1A.

FIG. 1B depicts a partially exploded view 110 of the card integrated circularly polarized antenna device 102 of FIG. 1A. In this view 110, a plurality of circuit cards, generally indicated at 112, may be arranged in parallel and coupled to circuitry within the tray 104. Circuitry within the tray may communicatively couple each of the circuit cards 112 to the backplane (not shown) using a connector 118. The backplane may include a PCB configured to pass signals between the plurality of circuit cards 112 and between the plurality of circuit cards 112 and external systems (not shown). In this example, the connector 118 may be implemented as a coaxial cable connector or another type of connector configured to facilitate communications between the circuit cards 112 and the backplane.

Each circuit card 112 may be sandwiched between metallic sheets 114, which may facilitate heat dissipation and mitigate parasitic effects between circuit cards 112. In this example, the sidewalls 106(1) and 106(2) are removed and shown in phantom, exposing the lateral metallic edges 116 of each of the plurality of circuit cards 112. The metallic edges 116 of each card 112 may include a foot or extension that may be configured to facilitate installation of the associated circuit card 112 into a coupling interface within the tray 104. In some implementations, the metallic edge 116 may provide radio frequency isolation along the lateral edges.

Each circuit card 112 may include an antenna array 108 of integrated unit antenna devices along an edge of the circuit card 112. In this example, the tray 104 may protect a first edge of each of the circuit cards 112. The sidewalls 106 may protect and isolate lateral edges and planar sides of each of the circuit cards 112. The antenna array 108 may be exposed to facilitate transmission and reception of radio frequency signals.

Figure 2A:
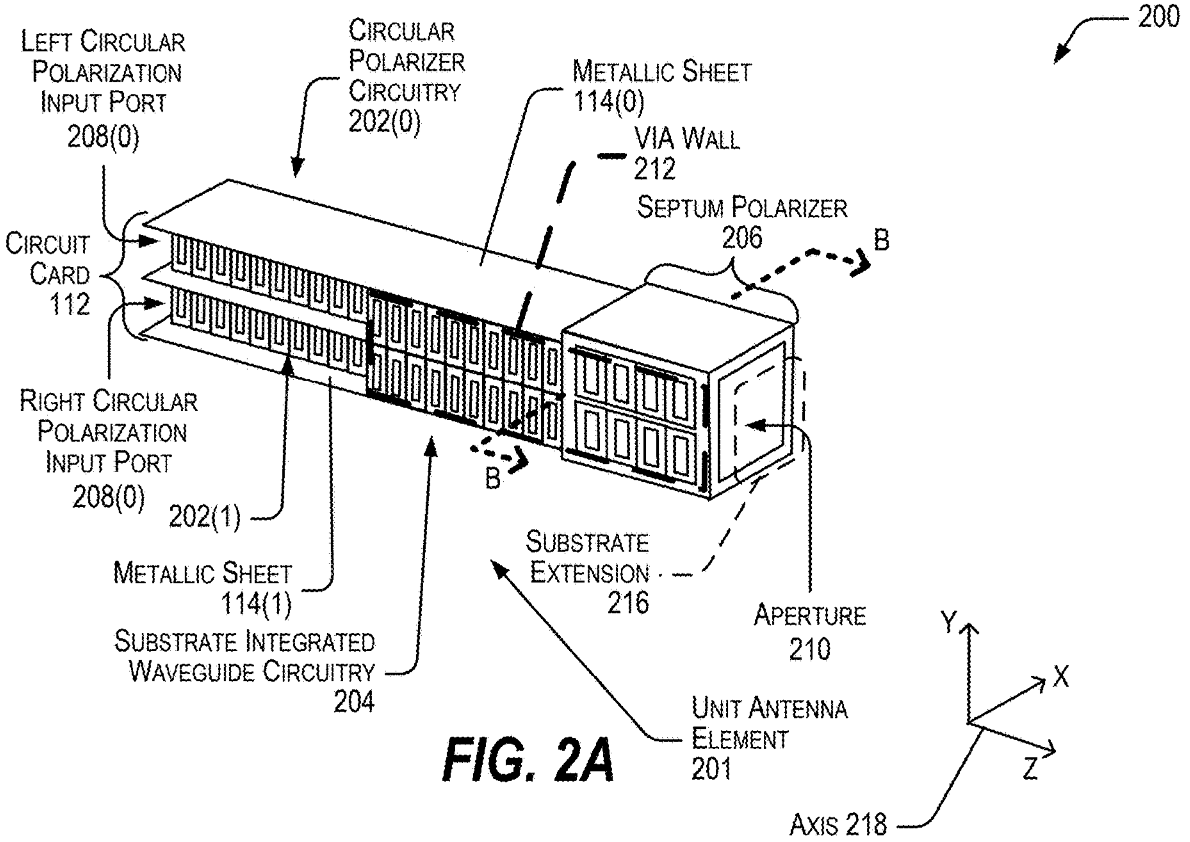
FIG. 2A depicts a perspective view of a diagram of a unit antenna element formed on a circuit card and including an integrated circularly polarized antenna, in accordance with certain embodiments of the present disclosure.

FIG. 2A depicts a perspective view of a diagram 200 of a unit antenna element 201 formed on a circuit card and including a card integrated circularly polarized antenna, in accordance with certain embodiments of the present disclosure. In this example, the unit antenna element 201 has a width extending in the X-direction, a height (or depth) extending in the Y-direction, and a length extending in the Z-direction. The axis 218 depicts the X-Y-Z directional axes of the unit antenna element 201. The antenna array 108 of the circuit card 112 that includes this unit antenna element 201 may extend in the X-direction, such that multiple unit antenna elements 201 are positioned side by side in the X-Z plane.

In this example, the top and bottom (in this view) of the unit antenna element 201 are covered with a metallic sheet 114(0) and 114(1), respectively. The unit antenna element 201 may include circular polarizer circuitry 202, substrate integrated waveguide circuitry 204, and a septum polarizer 206 with an aperture 210. The sides of the substrate integrated waveguide circuitry 204 and the of the septum polarizer 206 may include via walls 212, which may provide signal isolation.

The circular polarizer circuitry 202 may include a first circular polarizer 202(0) and a second circular polarizer 202(1) stacked on top of one another. The first circular polarizer circuitry 202(0) may include a first (left) circular polarization input port 208(0) to receive a signal to excite the first circular polarization circuitry 202(0). The second circular polarizer circuitry 202(1) may include a second (right) circular polarization input port 208(1) to receive a first signal to excite the circular polarization circuitry 202(1). Depending on which of the circular polarizer circuitry 202(0) or 202(1) receives a signal at its input port 208(0) or 208(1) respectively, the activated one of the circular polarizer circuits 208 excites the substrate integrated waveguide circuitry 204 to provide a linearly polarized transverse electric field to the septum polarizer 206, which converts the linearly polarized transverse electric field into a circularly polarized signal having a first (left) or second (right) polarization for transmission.

In reverse, a circularly polarized signal may be received at the septum polarizer 206, which may convert the circularly polarized signal into a linearly polarized transverse electric field, which may be delivered to the substrate integrated waveguide circuitry 204. The substrate integrated waveguide circuitry 204 may provide a signal to the circular polarizer circuitry 202, which may communicate the signal to other circuit components via an output port (not shown) or via one of the ports 208. An ideal circularly polarized signal may be composed of two orthogonal electric-field (E-field) components, with equal sinusoidally varying magnitudes, and 90 degrees out of phase with each other.

To maintain the CP radiation as close to the ideal as possible, a lens shaped substrate extension 216 may be formed at the aperture 210 of the square substrate integrated waveguide. The substrate extension 216 may provide an impedance matching layer, enhancing the radiated CP characteristics when compared to a square substrate integrated waveguide with a septum polarizer 206 and no substrate extension 216. The substrate extension 216 may facilitate matching of the resultant $TE_{01}$ mode. The substrate extension 210 may improve the impedance and axial rotation bandwidth of the unit antenna element 201 (and of the overall antenna array 108). In some implementations, the antenna array 108 may be configured to support satellite communications in both the K-band and the Ka-band.

Figure 2B:
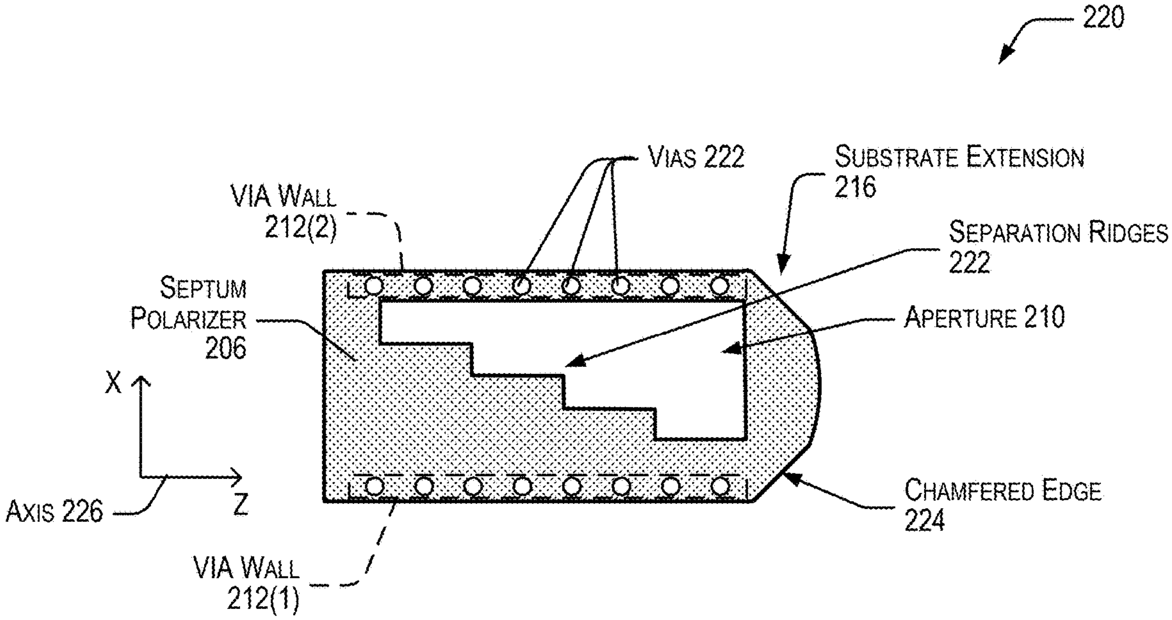
FIG. 2B depicts a cross-sectional view of the septum polarizer of the unit antenna element taken along line B-B in FIG. 2A, in accordance with certain embodiments of the present disclosure.

FIG. 2B depicts a cross-sectional view 220 of the septum polarizer 206 of the unit antenna element 201 taken along line B-B in FIG. 2A, in accordance with certain embodiments of the present disclosure. The X-Z axis 226 is shown to orient the reader to the view of the septum polarizer 206.

The septum polarizer 206 includes via walls 212(1) and 212(2) on opposing sides of the septum polarizer 206. The septum polarizer 206 may include a plurality of separation ridges 222. The separation ridges 222 may convert a linearly polarized transverse electric field into a circularly polarized signal and vice versa. An ideal circularly polarized signal is composed of two orthogonal E-field components, with equal sinusoidally varying magnitudes, and 90 degrees out of phase with each other.

The septum polarizer 206 includes the substrate extension 216 including chamfered edges 224. The substrate extension 216 may be machined from the circuit substrate, such as by machining the PCB or circuit substrate. Unlike lenses which may be formed from a different material and which may require glue to secure the lens to the aperture 210, the substrate extension 216 may be formed by removing material between adjacent unit antenna elements 201 along the edge of the circuit card 112.

In some implementations, the substrate polarizer 206 may be enabled using materials having different permittivity values or through use of layers or stack-ups that include different materials with selected material parameters, such as different permittivity values from layer to layer within the PCB stack.

Additionally, the implementation of the multi-step septum polarizer 206 that is shown in FIG. 2B is illustrative only and is not intended to be limiting. There are multiple approaches for implementing a multi-step septum polarizer 206, and the particular design may be optimized through the use of selected mathematical functions, such as Legendre polynomials or other functions, that may dictate the profile of the septum polarizer. Such approaches may enable enhanced performance at selected frequency ranges.

Figure 3A:
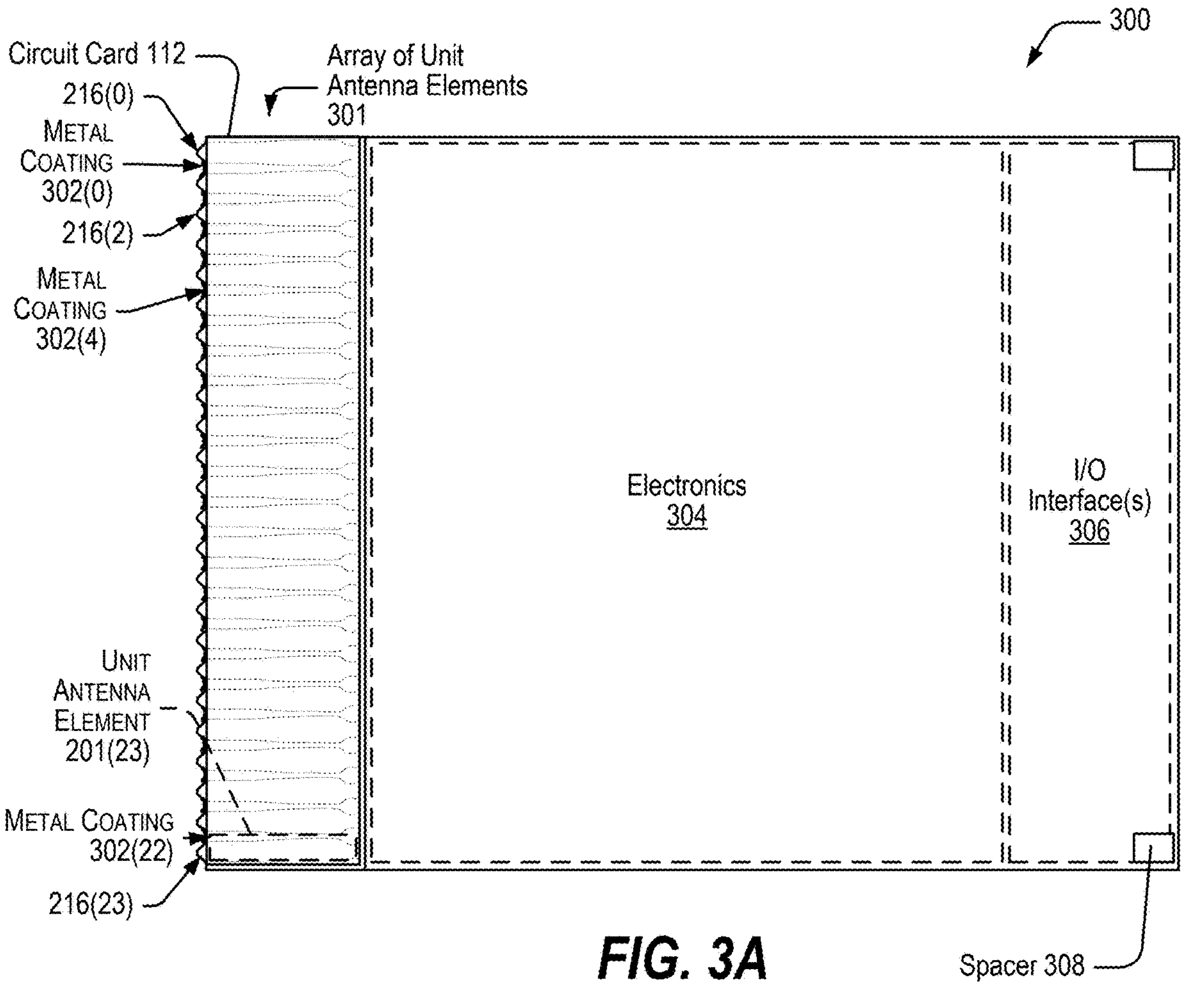
FIG. 3A depicts a top view of a circuit card including a linear array of unit antenna elements along an edge of circuit card, in accordance with certain embodiments of the present disclosure.

FIG. 3A depicts a top view 300 of a circuit card 112 including a linear array 301 of unit antenna elements 201 along an edge of an illustrative example of the circuit card 112, in accordance with certain embodiments of the present disclosure. The circuit card 112 may include electronics 304 (such as transmit/receive circuitry, filters, amplifiers, and other circuitry) and a plurality of input/output (I/O) interfaces 306, which may be configured to communicatively couple circuitry within the tray 104 to the unit antenna elements 201. The top view 300 depicts one possible implementation of a circuit card 112 that shows a particular feed approach; however, the circuit card 112 may be implemented with other circuit layouts and other approaches.

In this example, the substrate extensions 216 are visible along the edge of the circuit card 112 adjacent to the outputs of each of the unit antenna elements 201 of the array 301. The substrate extensions 216 may have chamfered edges 224 (in FIG. 2B), and adjacent extensions 216 may be separated by a valley or trench. The substrate extensions 216 may enable increased axial ratio bandwidth. The substrate extensions 216 may act as an impedance matching layer enabling a larger operational CP bandwidth across scan frequencies.

In some implementations, the valley or trench between adjacent substrate extensions 216 may include a metal coating 302. In this particular example, the linear array 301 may include twenty-four (24) unit antenna elements 201(0) through 201(23) and twenty-four corresponding substrate extensions 216(0) through 216(23). The metal coatings 302(0) to 302(22) may be painted or otherwise disposed in the trenches between the adjacent substrate extensions 216, thereby reducing interference between adjacent unit antenna elements 201.

As previously discussed, each circuit card 112 may be sandwiched between metallic sheets 114, which may provide heat dissipation benefits and signal isolation between adjacent circuit cards 112. The thickness of the circuit card 112 on an end corresponding to the array 301 of unit antenna elements 201 is greater than a thickness of the remainder of the area, to provide room for the electronics 304 and the I/O interfaces 306. To support the metallic sheet 114 and to maintain space between the circuit elements and the metallic sheet 114, the circuit card 112 may include one or more spacers 308.

Figure 3B:
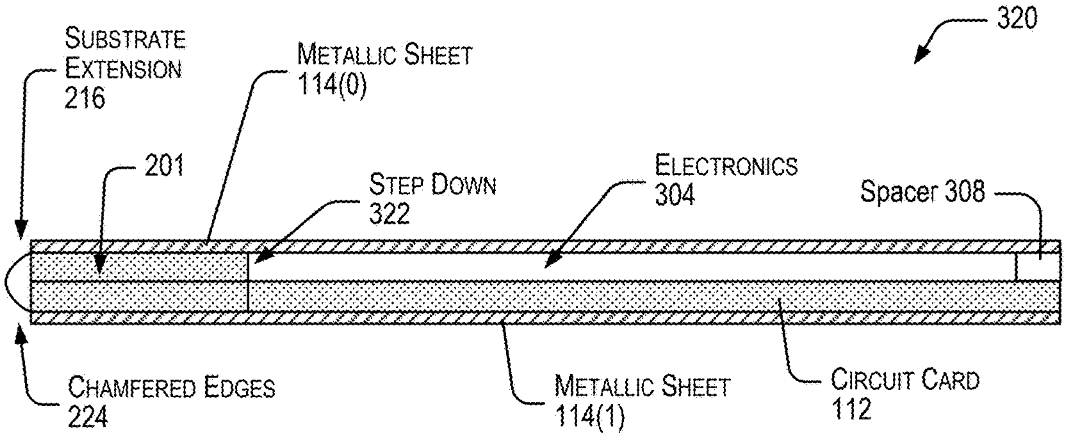
FIG. 3B depicts a side view of the circuit card of FIG. 3A sandwiched between metallic sheets and showing a step-down portion of the circuit card providing room for circuit components, in accordance with certain embodiments of the present disclosure.

FIG. 3B depicts a side view 320 of the circuit card 112 of FIG. 3A sandwiched between metallic sheets 114 and showing a step-down portion 322 of the circuit card 112 providing room for circuit components (such as the electronics 304 and the I/O interfaces 306), in accordance with certain embodiments of the present disclosure. In this view, the circuit card 112 includes a substrate extension 216 with chamfered edges 224 adjacent to the unit antenna element 201. The thickness of the circuit card 112 in the area of the unit antenna element 201 is greater than the thickness of the circuit card 112 after the step down 322, leaving room between the metallic sheet 114(0) and the circuit components.

In this view, the unit antenna element 201 may support a first end of the metallic sheet 114(0) and a second end of the metallic sheet 114(0) may be supported by the spacer 308. As previously discussed, each circuit card 112 may be separated from adjacent circuit cards 112 by metallic sheets 114, which may provide thermal dissipation, and which may prevent signal interference between adjacent circuit cards 112.

Figure 4:
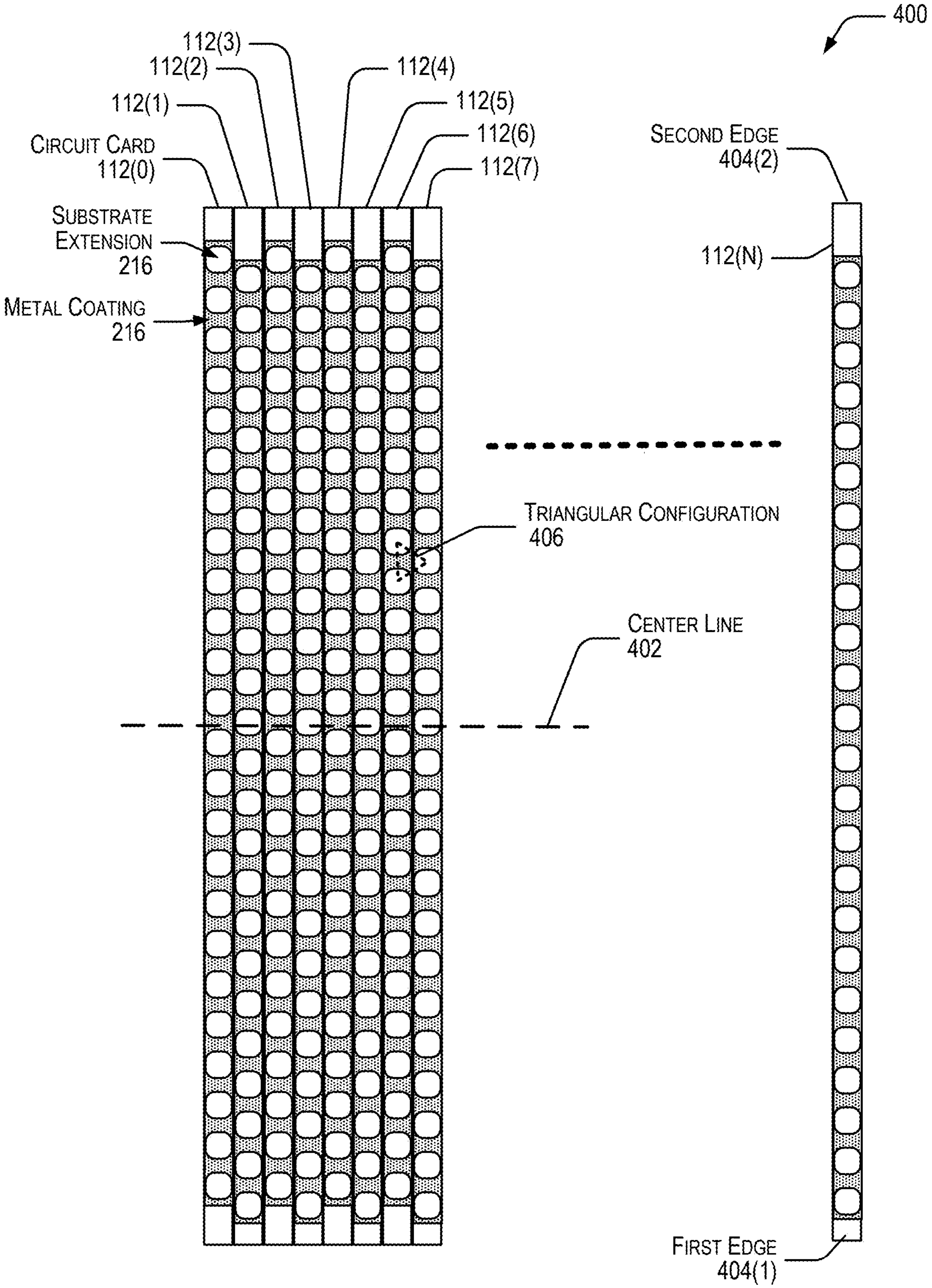
FIG. 4 depicts a top view of a portion of an implementation of the antenna device of FIG. 1A including multiple circuit cards arranged so that every other circuit card is rotated by 180 degrees, aligning the unit antenna elements to form a triangular lattice, in accordance with certain embodiments of the present disclosure.

FIG. 4 depicts a top view 400 of a portion of an implementation of the antenna device 100 of FIG. 1A including multiple circuit cards 112 arranged so that every other circuit card 112 is rotated by 180 degrees, aligning the unit antenna elements 201 to form a triangular lattice, in accordance with certain embodiments of the present disclosure. It should be understood that the depicted lattice is provided for illustrative purposes only and is not intended to be limiting. Square, rectangular, and other lattice shapes are also possible with departing from the scope of this disclosure.

In this example, the circuit cards 112 may be substantially the same (within margins of manufacturing tolerances), and the unit antenna elements 201 may be slightly asymmetric relative to a center line 402 of the circuit card 112. The connectors on the edge of the circuit card 112 that are opposite to the edge that includes substrate extensions 216 may be arranged to fit connection circuitry within the tray in a first orientation (zero degrees of rotation) or in a second orientation (180 degrees of rotation). In this example, the circuit cards 112(0), 112(2), 112(4), and 112(6) are arranged in the first orientation, and the circuit cards 112(1), 112(3), 112(5), and 112(7) are arranged in the second orientation.

Each circuit card 112 includes a first edge 404(1) and a second edge 404(2). In this example, the first circuit card 112(0) is installed such that its first edge 404(1) is at the top of the page and its second edge 404(2) is at the bottom of the page. In this example, the terms "top" and "bottom" are used to refer to the figure and are intended to relate to orientation of the device. In this example, the second circuit card 112(1) is oriented such that the second edge 404(2) is at the top of the page and the first edge 404(1) is at the bottom of the page. Thus, the second circuit card 112(2) is rotated 180 degrees relative to the first circuit card 112(1). During assembly, the circuit cards 112 may be inserted alternately in the first orientation (like the first circuit card 112(1)) and then the second orientation (like the second circuit card 112(2)). Alternating the orientations of circuit cards 112 in this manner produces a lattice configuration. An example of the triangular configuration 406 is shown in phantom with respect to three of the unit antenna elements 201.

It should be appreciated that the antenna device 100 may be sized to receive any number of circuit cards 112, which may be arranged in alternating orientations (as shown in FIG. 4) to produce a triangular lattice of unit antenna elements 201. By producing the array of unit antenna elements 201 with the slight offset from the center line 402 and by providing connectors to fit the underlying circuitry in either orientation, the circuit cards 112 may be used in either selected orientation or in alternating orientations (as shown) to provide a selected lattice architecture. Other implementations are also possible.

In conjunction with the devices and circuits described above with respect to FIGS. 1A-4, a phased array antenna device 102 may include a plurality of circuit cards 112, each of which may include a linear array of circularly polarized unit antenna elements 201 along an edge of each circuit card 112. The circuit cards 112 may be arranged in parallel to form the antenna device 102, and a plurality of linear arrays of unit antenna elements 201 are aligned on the edges of each of the circuit cards 112 to provide a two-dimensional (M×N) array 108 of unit antenna elements 201.

In some implementations, the circuit card may be implemented as a printed circuit board (PCB) or other circuit structure. Integration of the CP antenna elements 201 into the circuit card 112 may eliminate connectors, enable a reduced profile (reduced dimensions), reduce or eliminate insertion loss, reduce the overall weight, eliminate the need for a separate antenna tile, and reduce labor for each phased array device 102 as compared to phased array antenna devices that include a separate antenna tile. Additionally, the phased array antenna device 102 using substrate integrated unit antenna elements 201 may provide a wider CP bandwidth than the prior art. In particular, the phased array antenna device 102 may enable an increased axial ratio bandwidth, across both frequency and scan.

In some implementations, the phased array antenna device 102 may include a plurality of unit antenna elements 201. Each unit antenna element 201 may include a septum polarizer 206 positioned at the edge of the circuit card 112 and a pair of substrate integrated waveguides. Each substrate integrated waveguide may have a rectangular aperture and stacked such that the combination has a square aperture, each of which may be configured to excite the septum polarizer 206. Each unit antenna element 201 may include a substrate extension 216 with chamfered edges 224 protruding from a square aperture of the substrate integrated waveguides. The resultant CP radiation from the unit antenna element 201 may be enabled by the septum polarizer 206, which may produce a signal with first (right) polarization or second (left) polarization depending on which of the substrate integrated waveguides is used to excite the septum polarizer 206.

The substrate extension 216 may enable increased axial ratio bandwidth by acting as an impedance matching layer, which enables a larger operational CP bandwidth across scan frequency. The antenna design may enable both transmit and receive operations at a k-band operating bandwidth (from 17.7 to 21.2 Gigahertz (GHz)) and at a Ka-band operating bandwidth (from 27.5 to 31 GHz). In some implementations, portions of the chamfered edges 224 between adjacent substrate extensions 216 may be metallized by a metal coating 302 to provide improved inter-antenna isolation.

The circuit card 112 may be sandwiched on each side by a thin metallic sheet 114 to enhance the thermal characteristics of the system and to limit inter-chip interference. Each circuit card 112 may include a first portion (that includes a linear array 301 of unit antenna elements 201) having a first thickness and may include a second portion having a second thickness that is less than the first thickness. Each circuit card may include transmitter circuits, receiver circuits (transmit/receive circuits 304), and other circuitry (such as I/O interfaces 306) coupled to the array 301 of integrated antenna units 201 to facilitate sending and receiving radio frequency signals via the antenna units 201. The reduced thickness of the second portion may enable the circuit cards 112 to secure the various chipsets and may maintain a desired antenna pitch for optimal design considerations. A spacer may be provided on corners of the circuit card 112 to support edges of the metallic sheet 114.

In some implementations, each circuit card 112 may be constructed such that the array of unit antenna elements 201 along the edge are slightly offset from a centerline 402 of the circuit card 112. This slight asymmetry may enable a triangular lattice configuration by alternating the orientations of the circuit cards 112 during assembly.

Although the present invention has been described with reference to preferred embodiments, workers skilled in the art will recognize that changes may be made in form and detail without departing from the scope of the invention.

What is claimed is:

1. A phased array antenna device comprising:
- a base including circuitry configured to couple to a backplane; and
- a plurality of circuit cards arranged in parallel and coupled to circuitry of the base, each circuit card comprising an array of circularly polarized unit antenna elements integrated into the circuit card and arranged along an edge of the circuit card, each circularly polarized unit antenna element of the array configured to radiate electromagnetic signals directly from the edge of the circuit card.

2. The phased array antenna device of claim 1, wherein the edge of the circuit card comprises:
- a plurality of substrate extensions with chamfered edges formed from a substrate of the circuit card; and
- wherein each substrate extension corresponds to one of the circularly polarized antenna elements; and
- wherein the chamfered edges between adjacent substrate extensions form a trench that is aligned to edges of adjacent circularly polarized antenna elements of the array.

3. The phased array antenna device of claim 2, further comprising a metal coating formed in the trench between each of the adjacent substrate extensions.

4. The phased array antenna device of claim 2, wherein the substrate extension comprises an impedance matching layer.

5. The phased array antenna device of claim 1, wherein:
- the array of circularly polarized unit antenna elements of each circuit card is asymmetrical about a center line of the circuit card; and
- the plurality of circuit cards is configured such that every other circuit card is rotated 180 degrees relative to adjacent circuit cards to produce a triangular lattice configuration of the circularly polarized unit antenna elements.

6. The phased array antenna device of claim 1, wherein each circularly polarized antenna element comprises:
- a septum polarizer integrated into and formed at the edge of the circuit card; and
- a pair of substrate integrated waveguides configured to be selectively activated, each substrate integrated waveguide including a rectangular aperture and stacked such that the pair of substrate integrated waveguides form a square aperture to direct excitation signals from a selected one of the substrate integrated waveguides to the septum polarizer.

7. The phased array antenna device of claim 6, wherein:
- the pair of substrate integrated waveguides includes a first substrate integrated waveguide having a first input port and a second substrate integrated waveguide having a second input port;
- the first substrate integrated waveguide configured to excite the septum polarizer to provide an output signal having a first polarization in response to a signal received at the first input port; and
- the second substrate integrated waveguide configured to excite the septum polarizer to provide the output signal having a second polarization in response to a signal received at the second input port.

8. A phased array antenna device comprising:
- a plurality of circuit cards arranged in parallel, each circuit card comprising:
  - an array of circularly polarized unit antenna elements integrated into the circuit card and arranged along an edge of the circuit card, each circularly polarized unit antenna element of the array configured to radiate electromagnetic signals directly from the edge of the circuit card; and
  - a plurality of substrate extensions with chamfered edges formed from a substrate of the circuit card along the edge, each substrate extension corresponding to one of circularly polarized unit antenna elements.

9. The phased array antenna device of claim 8, wherein the chamfered edges between adjacent substrate extensions form a trench that is aligned to edges of adjacent circularly polarized antenna elements of the array.

10. The phased array antenna device of claim 9, further comprising a metal coating formed in the trench between each of the adjacent substrate extensions.

11. The phased array antenna device of claim 8, wherein the substrate extension comprises an impedance matching layer.

12. The phased array antenna device of claim 8, wherein:
- the array of circularly polarized unit antenna elements of each circuit card is asymmetrical about a center line of the circuit card; and
- the plurality of circuit cards is configured such that every other circuit card is rotated 180 degrees relative to adjacent circuit cards to produce a triangular lattice configuration of the circularly polarized unit antenna elements.

13. The phased array antenna device of claim 8, further comprising a base including:
- a connector configured to couple to a backplane; and
- circuitry coupled to the connector configured to couple to each circuit card to communicatively couple the array of circularly polarized unit antenna element to the backplane.

14. The phased array antenna device of claim 8, wherein each circularly polarized antenna element comprises:
- a septum polarizer integrated into and formed at the edge of the circuit card; and
- a pair of substrate integrated waveguides configured to be selectively activated, each substrate integrated waveguide including a rectangular aperture and stacked such that the pair of substrate integrated waveguides form a square aperture to direct excitation signals from a selected one of the substrate integrated waveguides to the septum polarizer.

15. The phased array antenna device of claim 14, wherein:
the pair of substrate integrated waveguides includes a first substrate integrated waveguide having a first input port and a second substrate integrated waveguide having a second input port;
the first substrate integrated waveguide configured to excite the septum polarizer to provide an output signal having a first polarization in response to a signal received at the first input port; and
the second substrate integrated waveguide configured to excite the septum polarizer to provide the output signal having a second polarization in response to a signal received at the second input port.

16. A phased array antenna device comprising:
a base including:
a connector configured to couple to a backplane; and circuitry coupled to the connector; and
a plurality of circuit cards arranged in parallel and coupled to the circuitry of the base, each circuit card comprising:
an array of circularly polarized unit antenna elements integrated into and arranged along an edge of the circuit card and configured to radiate electromagnetic signals directly from the edge of the circuit card; and
a plurality of substrate extensions with chamfered edges formed from a substrate of the circuit card along the edge, one or more of the substrate extensions corresponding to one of circularly polarized unit antenna elements.

17. The phased array antenna device of claim 16, wherein the chamfered edges between adjacent substrate extensions form a trench that is aligned to edges of adjacent circularly polarized antenna elements of the array, each circuit card further comprising: a metal coating formed in the trench between each of the adjacent substrate extensions.

18. The phased array antenna device of claim 16, wherein the substrate extension comprises an impedance matching layer.

19. The phased array antenna device of claim 16, wherein:
the array of circularly polarized unit antenna elements of each circuit card is asymmetrical about a center line of the circuit card; and
each of the plurality of circuit cards is configured such that every other circuit card is rotated 180 degrees relative to adjacent circuit cards to produce a triangular lattice configuration of the circularly polarized unit antenna elements.

20. The phased array antenna device of claim 16, wherein each circularly polarized antenna element comprises:
a septum polarizer integrated into and formed at the edge of the circuit card; and
a pair of substrate integrated waveguides configured to be selectively activated, each substrate integrated waveguide including a rectangular aperture and stacked such that the pair of substrate integrated waveguides form a square aperture to direct excitation signals from a selected one of the substrate integrated waveguides to the septum polarizer.

* * * * *